United States Patent [19]

Stoller

[11] Patent Number: 5,360,975
[45] Date of Patent: Nov. 1, 1994

[54] METHOD OF GAIN REGULATION FOR DOWNHOLE SPECTROSCOPY TOOLS WITHOUT USING A CALIBRATION SOURCE

[75] Inventor: Christian Stoller, Kingwood, Tex.

[73] Assignee: Schlumberger Technology Corporation, Houston, Tex.

[21] Appl. No.: 52,321

[22] Filed: Apr. 23, 1993

[51] Int. Cl.$^5$ .......................... G01U 5/04; G01U 5/06; G01U 5/10

[52] U.S. Cl. .................................... 250/262; 250/261; 250/369

[58] Field of Search ................ 250/252.1 R, 261, 262, 250/369

[56] References Cited

U.S. PATENT DOCUMENTS

| | | | |
|---|---|---|---|
| 3,270,205 | 8/1966 | Ladd et al. | 250/252.1 X |
| 3,521,064 | 7/1970 | Moran et al. | 250/261 |
| 3,829,686 | 8/1974 | Schultz et al. | 250/362 X |
| 4,394,574 | 7/1983 | Grau et al. | |
| 4,464,569 | 8/1984 | Flaum | |
| 4,507,554 | 3/1985 | Hertzog et al. | |
| 4,578,578 | 3/1986 | Lin et al. | 250/252.1 |
| 4,661,701 | 4/1987 | Grau | |
| 4,717,825 | 1/1988 | Smith, Jr. et al. | 250/262 X |
| 4,937,446 | 6/1990 | McKeon | |
| 5,120,955 | 6/1992 | Galford | 250/262 X |
| 5,171,986 | 12/1992 | Loomis et al. | 250/262 X |

FOREIGN PATENT DOCUMENTS

| | | | |
|---|---|---|---|
| 475928 | 3/1975 | Australia | 250/262 |
| 2173298 | 10/1986 | United Kingdom | 250/262 |

*Primary Examiner*—Constantine Hannaher
*Assistant Examiner*—Edward J. Glick
*Attorney, Agent, or Firm*—Henry N. Garrana; Darcell Walker

[57] ABSTRACT

The present invention provides a method of stabilizing the gain of spectroscopy equipment using the actual measured spectrum of the formation of interest and thereby eliminating the need to use external radioactive calibration sources. The gain is measured and adjusted using spectral fitting techniques. In these techniques, an energy spectrum of the radiation from an earth formation is measured. The measured spectrum is compared to a standard spectrum or composite spectrum. As a result of the comparisons, deviations between corresponding features of the two spectra are determined. Gain correction signals are calculated based on the determined deviations. The gain of the spectroscopy equipment is adjusted based on these calculated correction signals.

29 Claims, 7 Drawing Sheets

METHOD OF GAIN REGULATION FOR DOWNHOLE SPECTROSCOPY TOOLS WITHOUT USING A CALIBRATION SOURCE

FIELD OF THE INVENTION

This invention relates to a method of regulating gain for downhole spectroscopy tools without using a calibration source. In particular, it relates to a method of adjusting the gain of this equipment using features from the measured energy spectrum of an earth formation.

BACKGROUND OF THE INVENTION

The major objective of well logging is to obtain quantitative and qualitative information related to hydrocarbons in earth formations surrounding a well. In many nuclear well logging techniques the formation and borehole are irradiated by energetic nuclear particles such as neutrons and gamma rays. These particles may either be scattered in the formation or the borehole or they may undergo a nuclear reaction which results in the creation of a new particle or gamma ray. The scattered particles or newly created particles can be detected at one or several locations and by one or more detectors. The number of energy particles detected and their energy levels generate signals that contain information about the irradiated earth formation and the borehole. During the logging process, various processing techniques can be applied to these signals in order to get the desired logging information from the signal. One of these processing techniques is comparing features of these signals with other known data to make certain determinations about the information contained in the signals.

Many of the nuclear well logging techniques compare the measured signal with additional information. Many of the techniques compare the measured signals with other data based on spectral analysis of the measured signal. As stated earlier, these signals are sometimes gamma rays that result from interactions of atoms with neutrons emitted from a downhole radiation source. Such gamma ray signals are representative of certain atoms of the lithology of the formation (i.e. the matrix or the formation fluid) or of the borehole. In one example of spectral analysis, the energy spectrum of gamma rays resulting from the capture of the neutrons is decomposed into contributions due to individual formation elements, usually called "elemental yields". These elemental yields reveal information concerning the presence of earth formation elements such as hydrogen, silicon, calcium, chlorine, sulfur and iron. Important petrophysical parameters such as porosity, matrix lithology and water salinity may be derived from the elemental yields. An example of a capture gamma ray spectra analysis is depicted in U. S. Pat. No. 3,521,064 to Moran et al.

In Moran, a measured gamma ray energy spectrum, representative of a formation of unknown composition, is compared with a composite spectrum constructed from individual laboratory derived standard spectra of the constituents postulated to comprise the formation. This standard spectrum is composed of standard responses from certain formation elements. The different element responses of the standard spectra (elemental yields) which give the best fit to the measured spectrum when weighted by each element sensitivity (i.e. the ability of an element to emit gamma rays and be detected) represent the relative proportion of the constituents of the formation. "Fit" can be thought of as the closeness of the match between corresponding points of the measured and standard spectra. (If the signal was superimposed over the other signal, how close would the signals match/fit). In other well logging techniques, the calibration of the signal equipment is very important to the measurement of the signal. In these calibration processes, reference signals are used to align the measured signal with certain time or energy parameters. If there is not an adequate alignment between the reference point and the appropriate feature of the signal, an adjustment of the signal amplitude may be necessary to align the signal with the calibration reference. In addition, an adjustment of the signal amplitude may be needed to provide an adequate signal for measurement.

Since the alignment of features from the measured spectrum with features of a standard spectrum may be crucial in these techniques, it is important to guard against drifts and other variances between the measured spectrum and the standard spectrum. Any drifts that occur along the signal chain during the course of the measurement can cause peaks in the measured spectrum to broaden or become otherwise distorted. If this occurs, the proper fit may not be obtained and measured information could be lost. These drifts can develop through changes in temperature of the detector or associated electronics, gradual changes in voltage levels, or variations of the gain of the various active elements in the signal chain. Despite the best efforts to control temperature and other environmental conditions, spectra taken over long periods of time with high resolution detectors often suffer an apparent loss of resolution due to these drifts. In some detectors, large changes in counting rates can also lead to apparent gain changes over fairly short periods of time.

One parameter that is important in controlling measurement drifts and adjusting signal amplitudes is gain. The gain is the change in the signal power or amplitude necessary to keep the signal at an appropriate amplitude level. In gamma ray or particle energy spectroscopy it is important that the gain of the system be known and constant at all times. If the gain is unknown it is difficult or nearly impossible to analyze the spectrum for its components. Small variations in the gain during the spectrum measurements will lead to a degradation of the spectrum resolution. If the gain variation is large the spectrum can no longer be analyzed and the information is lost.

During the detection of gamma rays, gain regulation for energy dispersive gamma-ray detectors in general and for scintillation detectors in particular has been done in many different ways. If the environmental conditions of a system, including the gamma-ray flux, can be kept constant it may be sufficient to do periodic calibration of the detectors at intervals of hours or days using radioactive sources. This requires that signal drifts due to temperature or equipment component changes be almost imperceptible.

One example of the importance of gain regulation is seen using scintillation detectors and photomultipliers (PMT). Many gamma ray detection systems use scintillation detectors and photomultipliers. The gain of a PMT can change due to small changes in the surface conditions of the electrodes in the interior of the PMT. These changes can occur as a consequence of tube start up or during long operation due to the constant electron (and ion) bombardment of the electrodes which are responsible for the amplification process in the PMT.

The properties of scintillators do not change rapidly unless a catastrophic failure (breakage or chemical change) occurs. The light emission however depends strongly on the temperature of the crystal. If the temperature can be kept constant it is possible to stabilize the gain of the PMT by the use of a highly accurate light pulser which sends known constant amounts of light to the PMT. The gain of the PMT can be adjusted so that the light pulse always generates the same amplitude. This adjustment can be achieved by analog or digital techniques. However, this method does not correct for any changes in the scintillation light output.

In addition, in well logging the temperature of the tool in the wellbore is known to change dramatically from the surface (about 25° C.) to the bottom of the hole where the temperature can reach 150° C. and more. Under these circumstances the gain of a scintillation detector and its associated PMT can vary by a factor of two or more, therefore constant adjustment of the gain is necessary. Many applications require that the gain be kept constant to much better than one percent. Even if the detector is kept in a dewar the temperature changes are usually large enough to generate intolerable gain changes.

The main method of gain stabilization in this situation consists of using a radioactive source, the characteristic gamma-ray ray of which is used as a reference signal to stabilize the gain. This has the advantage that the gain of the entire system, including the preamplifier and ADC can be kept constant. However, in many applications the extra signal from the stabilization source is adding significantly to the background and therefore impeding the measurement of interest. This can be alleviated by using a gamma-ray source with a gamma-energy which is outside of the range of interest and/or by using various coincidence techniques. In the case of a neutron induced gamma-spectrum, the count rates in the gamma-spectrum are very high. At the present, this necessitates the use of a strong gamma-source for gain stabilization. This source however can be detrimental to parts of the measurements for which the count rate of interest is much lower. For example, the precision of the measurement of the formation capture cross section is strongly affected by a large number of background counts.

Although current methods of gain stabilization exist, there remains a need for a method which in the presence of a sufficiently high gamma-ray flux allows stabilization without the use of a strong calibration source or with no calibration source at all.

SUMMARY OF THE INVENTION

It is an object of this invention to provide a reliable and efficient method of determining and regulating gain of a measured energy spectrum of an earth formation.

It is an object of this invention to provide a method of determining and regulating spectrum gain without using a calibration source.

It is an object of this invention to provide a method of determining and regulating gain using features from the actual measured energy spectrum of an earth formation.

It is an object of this invention to provide a method of determining and regulating gain without adding any signal strength to background signals.

It is an object of this invention to provide a method for determining the initial gain to be used in the gain regulation process.

The present invention provides a method for gain regulation of nuclear well logging equipment without the need to stabilize the gain on one particular feature of a measured spectrum and without the need of an extra calibration source that generates a special spectrum feature. The method of the present invention operates on the concept that a detected and measured energy spectrum of a formation contains information that can be used to determine the gain for that spectrum. This invention extracts that information and uses it to regulate the gain during the measuring of that spectrum.

During the detection and measurement of an energy spectrum representative of an unknown earth formation, this invention examines a plurality of features from the measured spectrum and attempts to stabilize the gain on the feature(s) in such a manner as to obtain the best indication of the spectrum gain. The best indication of gain corresponds to the best fit or alignment of the measured and a reference spectrum which could be a composite spectrum or a single spectrum (reduction of the deviation between the composite or reference spectrum and the measured spectrum). This stabilization procedure employs spectral fitting techniques that are similar to techniques used to determine unknown elements measured in an energy spectrum. In this process, the spectrum features (such as gamma ray peaks) of the measured spectrum are compared with corresponding features of a composite spectrum in order to find the best feature match between the spectra (the corresponding features with the smallest deviation). A composite spectrum is a composite of standard spectra of several formation materials. The fractions of the standard spectra which summed together yield the smallest deviation are an indication of the elemental composition of the borehole and the formation. The process by which the corresponding features are compared and aligned is known as "fitting".

The above mentioned fitting process may also involve an adjustment in the energy scale of the measured spectrum to obtain a better match between the composite or reference spectrum and the measured spectrum. The relation between the energy scale of the standard spectrum and the measured spectrum can be written as:

$$E' = f(E)$$

where E is the energy scale of the measured spectrum and E' the scale of the composite spectrum. f(E) is a monotonic function. In most applications f(E) is a linear function of the form $$E' = offset + gain.E$$

where the offset is the deviation of the origin of the two scales and gain describes the relative amplitudes in the two spectra. If there is a difference between the two energy scales an adjustment of the energy scale of the measured spectrum to better match the composite spectrum will result in an improved fit. Conversely, this fact can be used to determine the deviation of the gain from the composite spectrum and then to take corrective action by adjusting the gain of the measuring system.

According to this invention, the gain of the nuclear well logging equipment is regulated by steps comprising: establishing an energy spectrum of measured energetic particles or gamma rays from an earth formation; determining deviations between corresponding features of the measured energy spectrum and a reference energy spectrum; and regulating spectrum gain from the deviations between the corresponding features. In this procedure, the deviations between corresponding features can be determined from the best fit between the features.

According to another embodiment of the invention, the initial gain used in the gain regulation process is determined. In this process, the initial gain is determined by calculating the parameters for a test gain setting; generating a standard gamma ray spectrum; adjusting the standard spectrum to the test gain setting; determining the best fit for the standard spectrum; and determining the initial gain from the best fit.

DESCRIPTION OF THE PREFERRED EMBODIMENT

Figure 1:
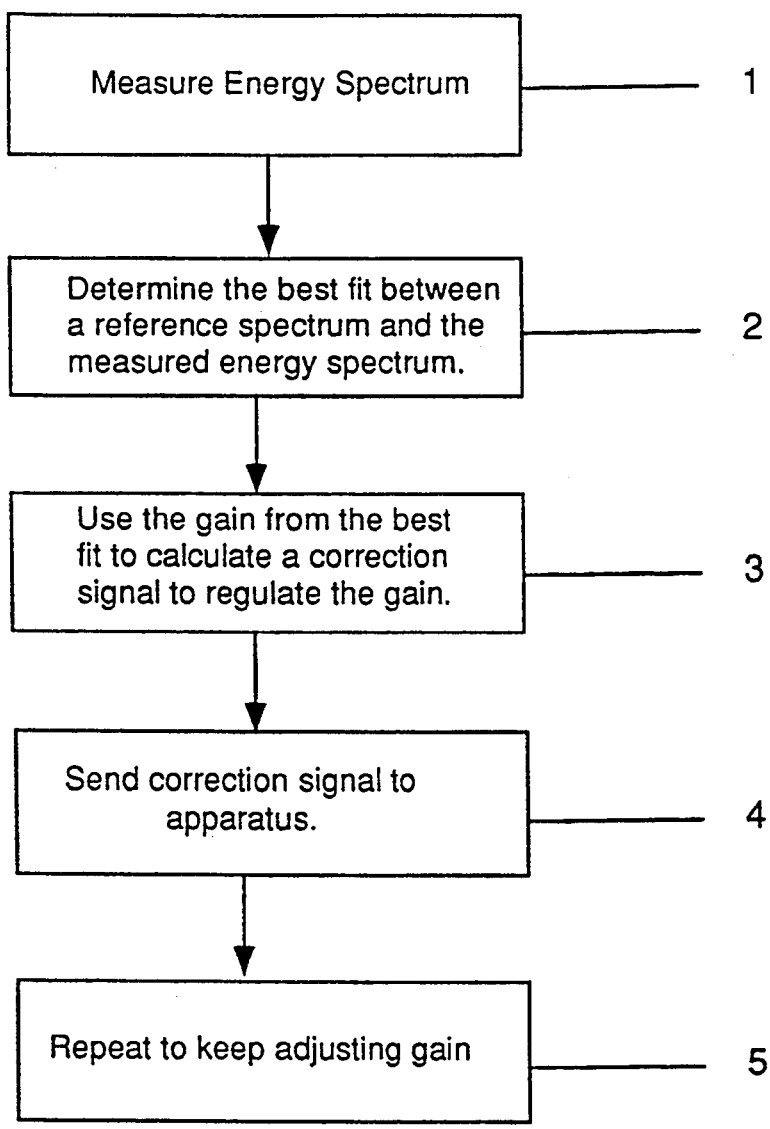
FIG. 1 is a flow diagram of the steps performed during the process of regulating gain.

The invention, although being applicable to numerous kinds of spectroscopy measurements, will be described in connection with the logging industry and, more particularly with nuclear logging techniques involving irradiating the earth formation surrounding a well with neutrons and detecting the gamma rays resulting from inelastic reactions or the capture of neutrons by the atoms of elements in the formation. Such techniques are described in U.S. Pat. No. 4,464,569 (Flaum) and U.S. Pat. No. 4,394,574 (Grau et al.).

The method of this invention is used during nuclear well logging procedures. In many nuclear well logging procedures, the earth formation is irradiated by neutrons or gamma rays that interact with formation or borehole elements. This interaction may result in the scattering of the incoming particle and a corresponding change in the particle's energy or in the generation of a new particle or gamma ray as a consequence of the interaction. The incoming particle may or may not disappear during the interaction. In other procedures, the nuclear measurement is used to determine elements in the formation or the borehole from naturally occurring radioactive gamma rays. Yet other measurements determine gamma ray spectra from radioactive tracer elements injected in the borehole or the formation.

These particles or gamma rays are detected and the energy they deposit in the detector is represented by an electronic signal. The analog signal is digitized and an energy spectrum of the digitized signals is formed. This energy spectrum can then be analyzed to determine formation or borehole elements or other physical properties of the materials surrounding the gamma ray tool.

As mentioned before, the gain of the spectroscopy apparatus may need to be adjusted to prevent a degradation of the spectral shape and/or a mismatch in alignment between the measured and the reference spectra.

The spectral gain (i.e. the conversion between the measured electronic signal amplitude and the actual energy deposited by the particle or gamma ray) can be adjusted by adjusting the electronic gain (amplification) of the apparatus. The gain adjustment will result in a change in the amplitude corresponding to spectral features. The resulting spectral stability is crucial for a meaningful analysis of the spectral data.

This invention uses spectrum decomposition concepts and techniques that are similar to those used in spectral analysis. Through the use of these techniques, the actual measured energy spectrum of the particles or gamma rays of interest is used to achieve gain regulation. Although first applied to tools which measured neutron induced gamma rays, the method of this invention can be and has been applied to other gamma tools as well.

Spectral analysis techniques are effective in determining gain because the measured energy spectrum is very variable as the composition of the borehole and formation changes, it is not possible to stabilize on a single peak with any degree of certainty. However, the techniques used to extract the spectral composition, such as described in Grau et al, not only determine the fractional composition of the spectrum, but can also determine small deviations in the gain. The determined gain can be used to derive a correction signal for the gain regulation.

The basic technique for performing such analysis is described in U.S. Pat. Number 3,521,064 issued to Moran, et al. In accordance with the Moran et al teaching, a detected gamma ray energy spectrum for a formation of unknown composition is compared with a composite spectrum comprised of weighted standard spectra representing the elements present in the formation. The weight coefficients for the standard spectra which give the best fit of the standard composite spectrum to the unknown measured energy spectrum, as determined, for example, by the method of least squares, represent the relative proportions of the elements in the formation. The best fit is defined by the minimum deviation between the measured and the fitted spectrum. The deviation can be measured in several ways. The most common one is to determine the statistically weighted average square deviation between the measured and the fitted spectrum. In order to further improve the fit (alignment) between the measured spectrum and a composite spectrum comprising the plurality of standard spectra, the standard spectra are adjusted to compensate for differences between the spectral resolution of the unknown spectrum and the spectral resolution associated with the standard spectrum.

A tool used to perform this invention is described in U.S. Pat. No. 4,464,569 issued to Flaum. The tool includes a pulsed neutron source for producing high energy neutrons for irradiating the formation and at least one radiation detector for detecting gamma radiation from the information. Other neutron sources such as a chemical neutron source or an electronic neutron source can also be used in this tool. An amplifier acts on the output signal from the detector. The amplified pulses are applied to a pulse height analyzer suitable for the analysis of nuclear pulses. The pulse height analyzer supplies signals in suitable digital form representing the amplitude of each analyzed pulse and segregates the detector pulses into predetermined energy channels (windows) according to their amplitude to provide an energy spectrum.

Before describing in greater detail the particular steps performed in the present invention, it is instructive to generally discuss the underlying theory upon which the spectral fitting analysis is based.

The measured spectrum obtained with the pulse height analyzer is recorded as a histogram. The abscissa is the energy axis which is divided into "m" energy intervals or windows; for typical scintillation detector resolution, m=256. The m energy windows may be of equal width. The ordinate for the $i^{th}$ energy window is the number (or counts) of gamma-rays accumulated for that energy window. In the following discussion, the spectra are represented as m-dimensional vectors "U". The components "$U^i$" of each vector "U" are normalized such that the sum of the $U^i$'s is unity over the energy range of interest, which may be narrower than the whole energy range. In general, a formation spectrum as measured can be described as a linear combination of a complete set of "n" individual standard descriptor spectra, $S_k$ (k=1, 2, ..., n). Each of these individual standard spectra may correspond to a postulated element i.e. an element expected to be present in the formation. Thus, "n" is the number of constituents postulated to constitute the formation under investigation. The vectors for the standard spectra are mathematically represented by column vectors of an "m×n" composite spectra matrix "S" such that $$U^i = \sum_{K=1}^{n} S_k^i Y_k = S \cdot Y$$

where "Y" is a vector whose components are the elemental yields $Y_k$ each of which represents the fractional contribution from the corresponding standard vector, $S_k$, to the measured spectrum U; i is the channel number in the spectrum S or U. The most significant spectral-response functions required for the capture spectra are usually for elements, H, Si, Cl, Ca, Na, Fe, Gd, Ti and activation background.

Referring to FIG. 1, one embodiment of this invention is illustrated. In this embodiment, an energy spectrum is measured as indicated in step 1. The energy spectrum reflects the composition of the unknown elements of the formation of interest. The measured energy spectrum is compared in step 2 with a reference standard spectrum. This spectrum is usually a standard composite spectrum and is used to determine the best fit/match between the spectra. The best fit is the result of determining the deviation between the two spectra and determining the amount of adjustment needed in order to adequately align the signals. This adjustment is made to the signal by adjusting and regulating the logging equipment gain. The gain required to adjust the desired spectrum to determine the best fit is used to calculate a corrected gain signal as shown in step 3. The gain correction signal is then sent to the spectroscopy equipment in step 4 where the gain is adjusted as needed. This process is then repeated in step 5 to continue gain adjustments.

Figure 2:
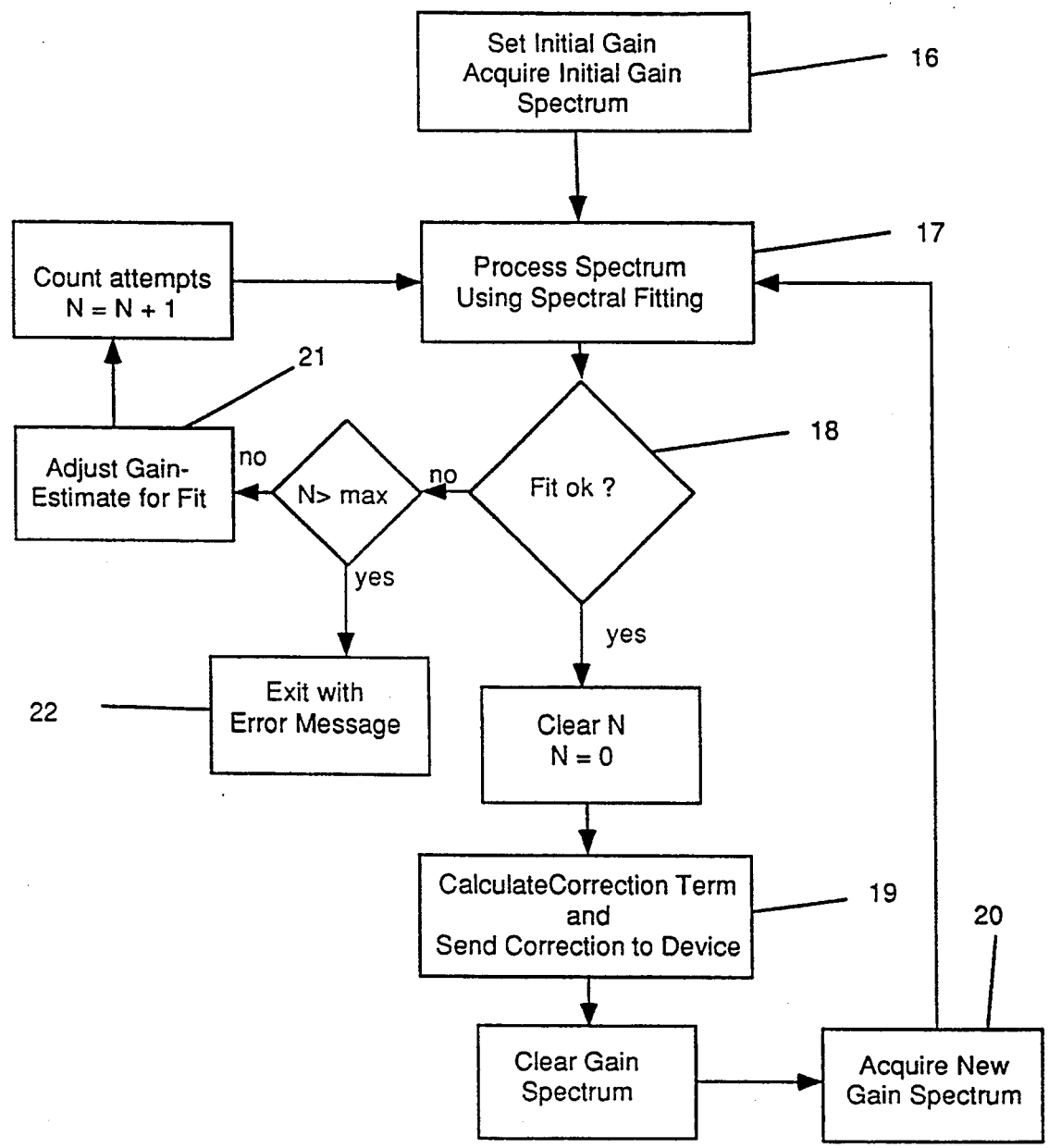
FIG. 2 is a detailed flow diagram of the steps performed in the preferred embodiment of this invention using the measured spectrum.

FIG. 2 outlines the preferred embodiment of this invention. The previously described method may become unreliable if the gain is in error by more than approximately five percent. This is because the fitting procedure will often not converge to the correct solution if the gain deviation between the fit and the measured spectrum exceeds five percent. This is due to the occurrence of local minima, i.e., chi-square will reach a minimum and small changes in the gain will always result in a larger chi-square. However, a lower minimum exists for a larger gain change. Therefore a method has been devised to adjust the gain initially to better than five percent. In this method, an initial gain is set 16 and serves as a starting gain from which the gain of the tool is adjusted. Several methods can be used to determine the initial gain. Some of these methods are: setting a gain in the spectroscopy tool before the tool source is enabled or inserted; using a small calibration source to determine the initial gain; setting a gain using a spectral fitting procedure; setting a gain using a peak search algorithm; setting an initial gain from prior calibration measurements and the present environmental conditions of the tool in particular the tool temperature; and setting the gain using a measured spectrum for a "coarse" estimate. These methods will be discussed later in this description.

Once the initial gain has been set, an energy spectrum is measured and fitted 17 as described in Moran and Grau et al. As stated previously, the spectrum fitting process is a method of matching the measured spectrum derived from the detection of energetic particles representative of unknown spectrum with a standard spectrum, wherein both the measured and reference spectra are expressed in a numerical form. The two spectra are represented by histograms, in which each channel of the histogram represents the absolute or relative number of counts in the energy window corresponding to such a channel. If a 256 channel spectrum is used to represent the energy range from 0 to 7500 keV, each channel corresponding to a window of width 7500/256=29 keV. Channel 1 corresponds to an energy between 0 and 29 keV, channel 2 to 29 to 58 keV, . . . channel 256 to 7471 keV to 7500 keV.

In the determination of the fit 18, the two spectra are compared to each other to determine the amount of adjustment that is necessary to align the two spectra. The measured spectrum is adjusted to improve the fit between to the two spectra and the goodness of the fit is determined. The goodness of fit is a measure indicating how well a modeled (fitted) curve matches a second measured curve. One way to describe the goodness of fit is through the use of chi-square. Chi-square describes the average weighted mean square deviation between the fitted and the measured curve. This is one of the most common descriptions of goodness of fit but by no means the only one.

The goodness of fit can be used to determine if a fitting procedure converged properly and found an adequate solution. A large chi-square indicates either an inappropriate model description, or the inability of the fitting procedure to find the best solution. In the case of the method described herein, the latter indicates an initial gain setting which was not close enough to the correct solution. If no better solution can be found, it has to be assumed that the measured spectrum cannot be appropriately described by the model. In most cases, this indicates a malfunction of the equipment.

The "goodness of fit" is analyzed to determine if the fit has converged to the absolute minimum in chi-square. Local minima usually exhibit significantly larger values of chi-square (or other measures of goodness of fit) than a "good" minimum. Therefore, a tolerance level has to be assumed that the gain adjustment needed is larger than five percent and that a coarse adjustment is needed before proceeding. If the fit is in the acceptable tolerance, a gain correction term is calculated and sent to the tool 19 and the gain for the tool is adjusted according to the correction term. The present gain spectrum, which will be the initial gain the first time through this process, will be replaced 20 with the new gain spectrum. The fitting process then repeats to determine a new gain adjustment (the gain is constantly being measured and if necessary adjusted during the well logging process).

If the fit in 18 is not acceptable, a new gain needed for an acceptable fit is estimated and the initial gain is adjusted according to the estimate gain 21. This adjusted spectrum is again compared to the standard spectrum 17 to determine the fit. This fit is then analyzed in 18 as before to determine if the fit is within acceptable tolerances for a reliable gain correction. This process of adjusting the estimated initial gain when an acceptable fit cannot be achieved continues for a specified number of attempts. If the predetermined number of attempts has not produced a successful fit, the gain regulation process is suspended and an error message 22 is sent to the equipment operator.

Another alternative method of this invention compares several corresponding features of the measured and standard spectra. These features can be well defined maxima or minima in the spectrum, as well as points where the spectra shape shows a pronounced change. In this case a fitting procedure can be used to determine the parameters which lead to the best fit for each feature. Using a weighted average it is possible to find the average parameter (gain) which best describes all of the features. This average gain is chosen as the value from which to calculate the needed gain correction.

In the preferred embodiment, one key factor is the setting of the initial gain. The initial gain serves as the reference gain from which the gain will be adjusted. As stated earlier, several methods for setting the initial gain exist. One method is to use a small calibration source to adjust the gain before neutrons are turned on in a tool containing an accelerator based source. A very weak calibration source is used to regulate the gain, so that a relatively known peak in the gamma-spectrum corresponds to a given channel number in the detector's energy spectrum. The calibration source will generate a peak at a known location in the energy spectrum. During the measurement of the actual energy spectrum, the calibration peak is detected in the energy spectrum. The detected peak position will be compared with the desired location of the calibration peak to determine the deviation between the two positions. This deviation is used to determine the gain adjustment needed to more closely align the peak with the predetermined position. It should be noted that this method does not work well in environments which have a large gamma background. The reliability of this method is proportional to the strength of the calibration signal.

In a second method for determining the initial gain, calibration measurements are performed using radioactive sources to determine the gain settings of a system at ambient temperature. Also determined in this method is the dependence of gain settings on temperature. Using this information and the measured tool temperature, a starting value for the gain settings can be estimated.

A third method for determining the initial gain does not use any external information, such as signal peaks from calibration sources. This method is preferred and is consistent with the philosophy of this invention of determining gain from the measured energy spectrum. In this method a "coarse search" is done for the initial gain. A coarse search tries to estimate the gain needed in a cursory manner. The gain found in this case can be used either to do a first adjustment of the gain of the system or to get an estimate of the gain to be used as a starting value for a fitting procedure. One way to perform this coarse search is to perform a grid search in which the measured spectrum is fitted to a standard spectrum for a large range of gains. The gain for which the goodness of fit reaches a minimum serves as a good estimate for the initial gain. Another alternative method of this invention compares several corresponding points of the measured and standard spectra. The method then determines which comparison of points yields the best fit. In this method, a spectrum of unknown composition is generated and compared with a standard spectrum of known composition. During this process, corresponding points from the two spectra are compared and the fit/match between each set of points is recorded.

Figure 3:
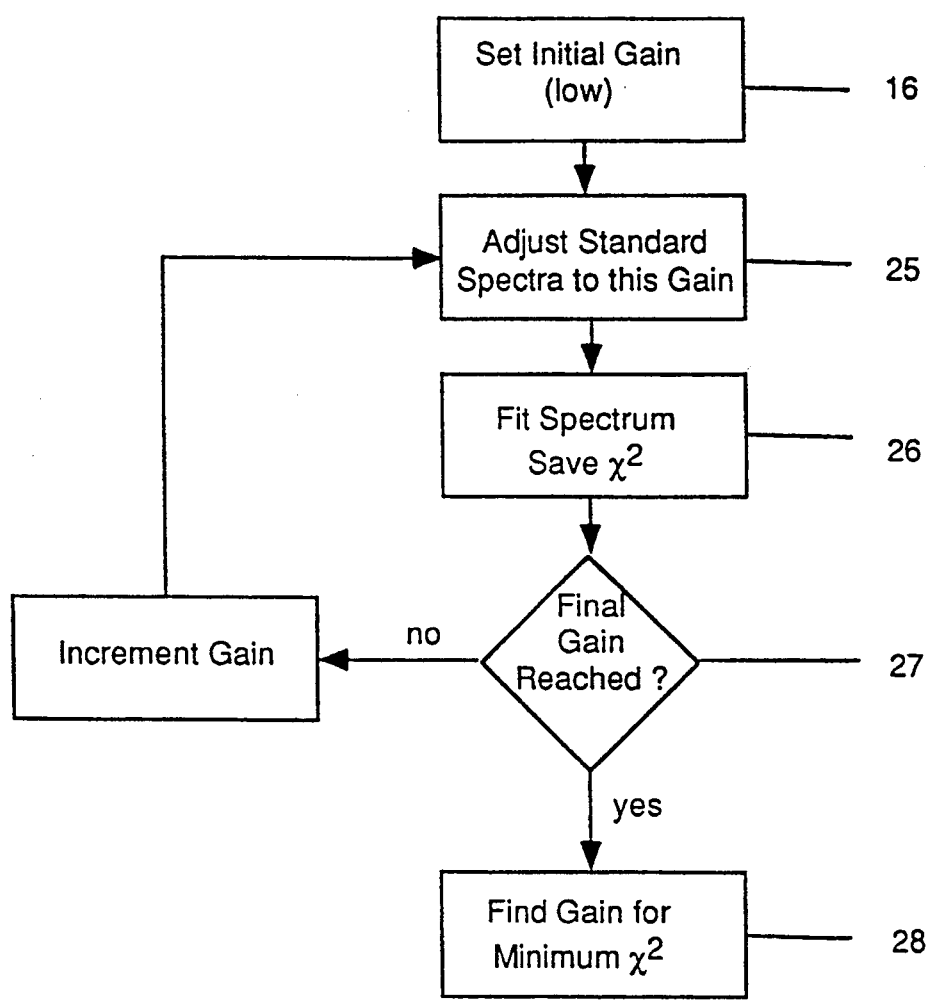
FIG. 3 is a flow diagram of the steps performed during the process of searching for the initial gain using spectral fitting.
Figure 4:
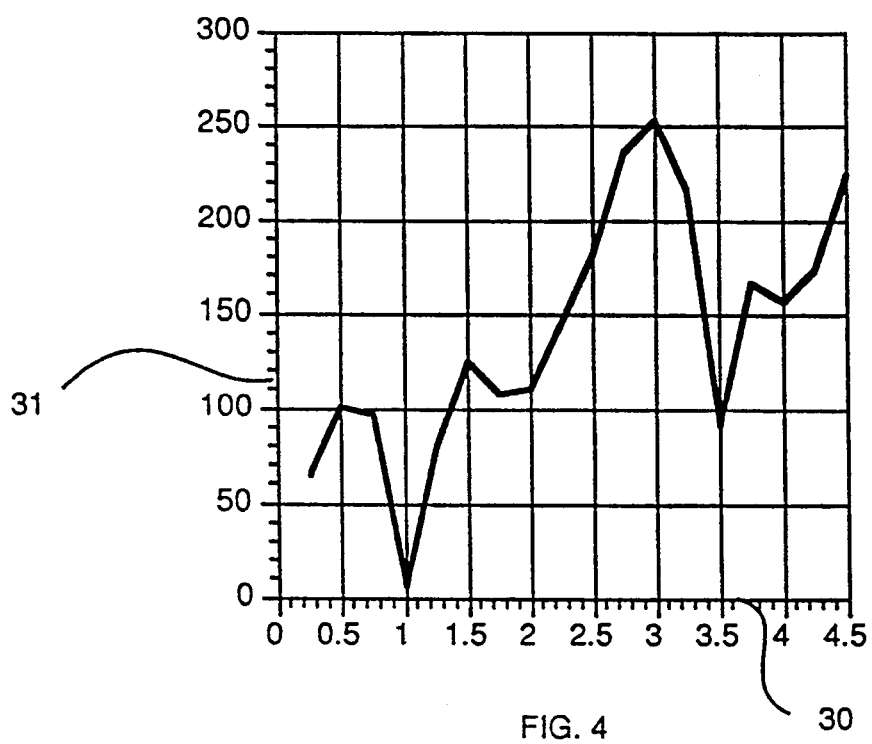
FIG. 4 is a graph illustrating the goodness of the fit represented to the spectrum by the Chi-square as a function of gain applied to a standard spectrum.

The "grid search" method for estimating initial gain is illustrated in FIG. 3. In this method, a plurality of gains is calculated and the best gain is selected from the plurality of gains. In the first step 16, the initial gain for the search is selected. This starting value of the gain should be well below the expected gain. This is necessary to ensure that as the gain is increased in a predetermined number of steps, the actual gain is in the range which will be covered by the search. The search finishes at a gain which is well above the expected gain. The gain search could also be started at a gain which is significantly above the expected gain and then proceed to a gain which is significantly below the expected gain. In the second step 25, the standard spectrum is adjusted to this low gain. During this step, the features of the standard spectrum are rescaled to represent a spectrum taken at the lower gain. The third step 26 uses the rescaled standards to obtain a fit to the measured spectrum. As stated above, the process uses spectral fitting techniques. One technique which is particularly desirable is the least squares technique. This technique is well known to those skilled in the art. In this same step, the quality of the fit chi-square ($X^2$) for the respective gain is saved. The next 27 determines if the upper gain has been reached. If so, the next step 28 is to search the quality of fit results $X^2$ that were stored to find minimum $X^2$. This minimum $X^2$ represents the fit that most closely matches the standard and measured spectra. However if the procedure has not reached the upper gain limit, the gain is incremented and the procedure repeats steps 25, 26, and 27 for this new gain. FIG. 4 shows $X^2$ results from fits with variable gains. This figure shows the chi-square 31 of fit to spectrum as a function of gain 30 as it is applied to the standard spectrum. The results of this method show a pronounced minimum as well as a local minimum as the gain is changed form 0.25 to 4.5. A local minimum is a place where the goodness of fit shows a minimum over several subsequent steps and then increases again before dropping to a lower minimum in another part of the search.

Figure 5:
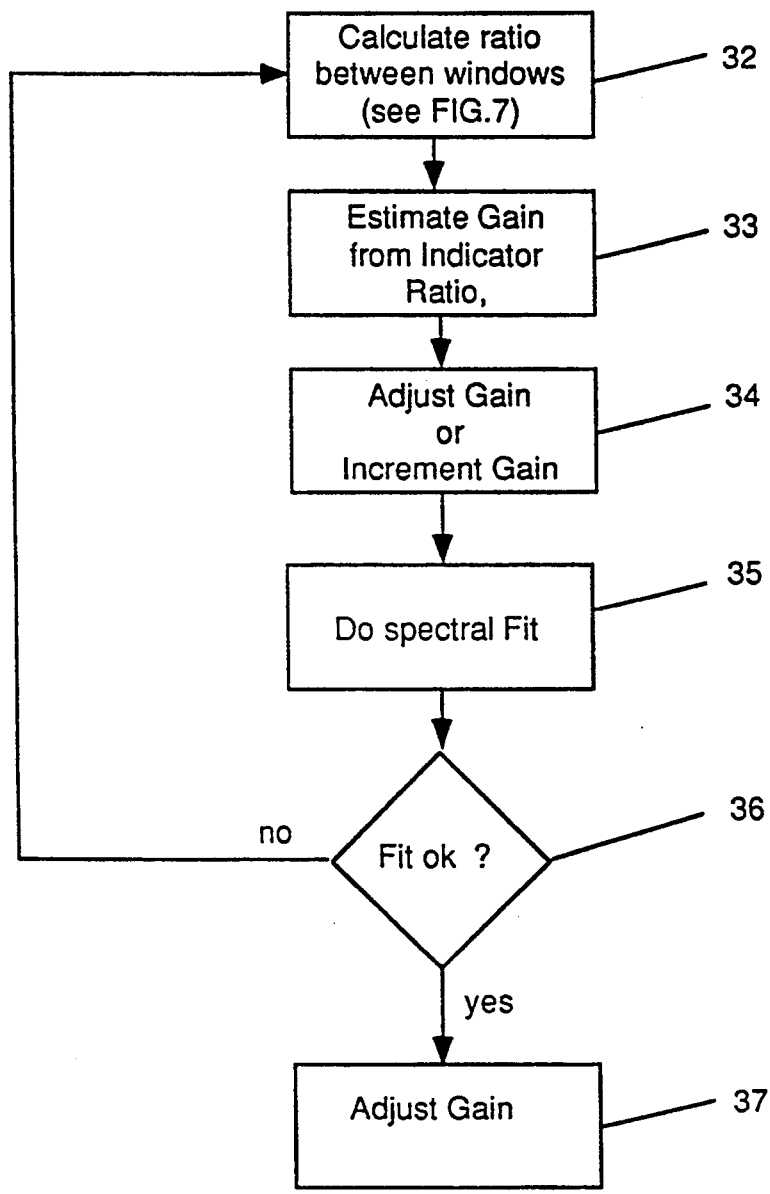
FIG. 5 is a flow diagram of the steps performed during the process of searching for the initial gain using windows/ratios.
Figure 6:
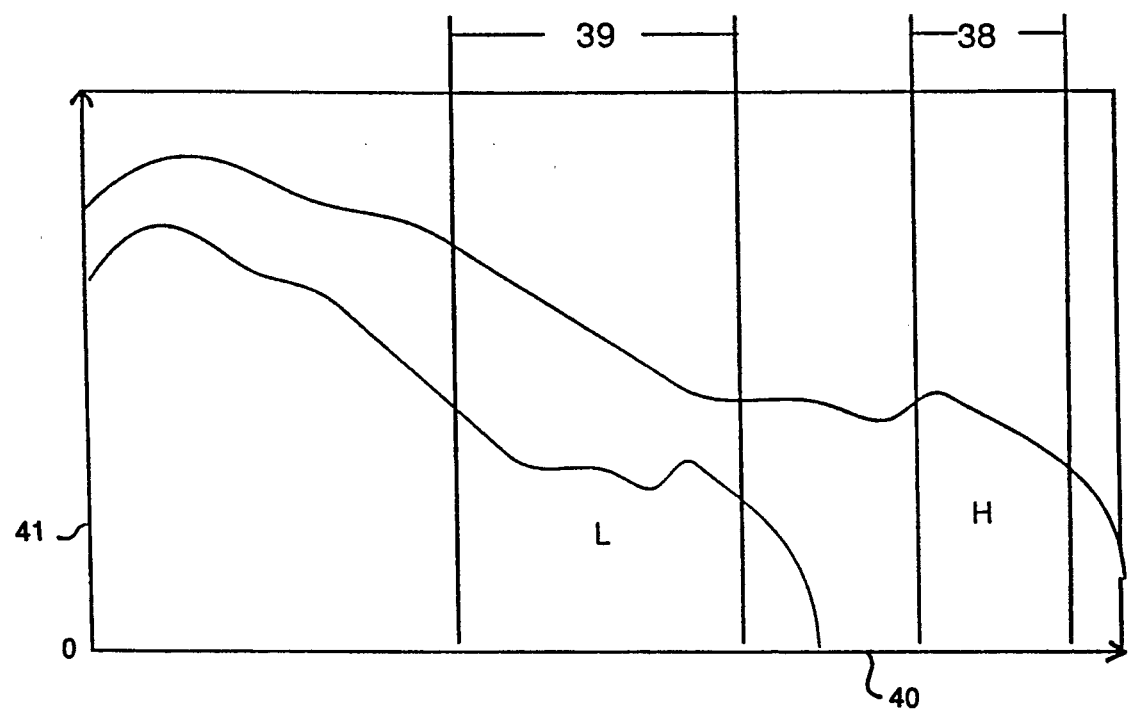
FIG. 6 is a diagram showing the windows in the spectra.

Another method for determining the initial gain uses a windows ratio search. FIG. 5 illustrates the steps in this approach. Before initiating this procedure, energy spectral windows are selected for use during the gain detection process. The windows are chosen in such a way that the ratios of the total counts in them are an indication of whether the gain is high or low. The ratio of two windows can be very sensitive to the gain setting if the spectrum shows a sharp increase or decline of counts in a given part of the spectrum. In some cases, no counts are expected in the spectrum above a given energy. If one of the windows is set in a part of the spectrum which is at the upper end of the possible counts, a sharp drop in the ratio with a window in a lower part of the spectrum indicates the absence of counts in the high energy part and thus a gain which is too low. A significant increase in the ratio can indicate too many counts in the spectral region corresponding to the top part of the spectrum. This can be a sign of a gain which is set too high. FIG. 6 shows high and low spectral windows 38 and 39 respectively, as a function of the number of counts 41 and the energy level 40.

Figure 7:
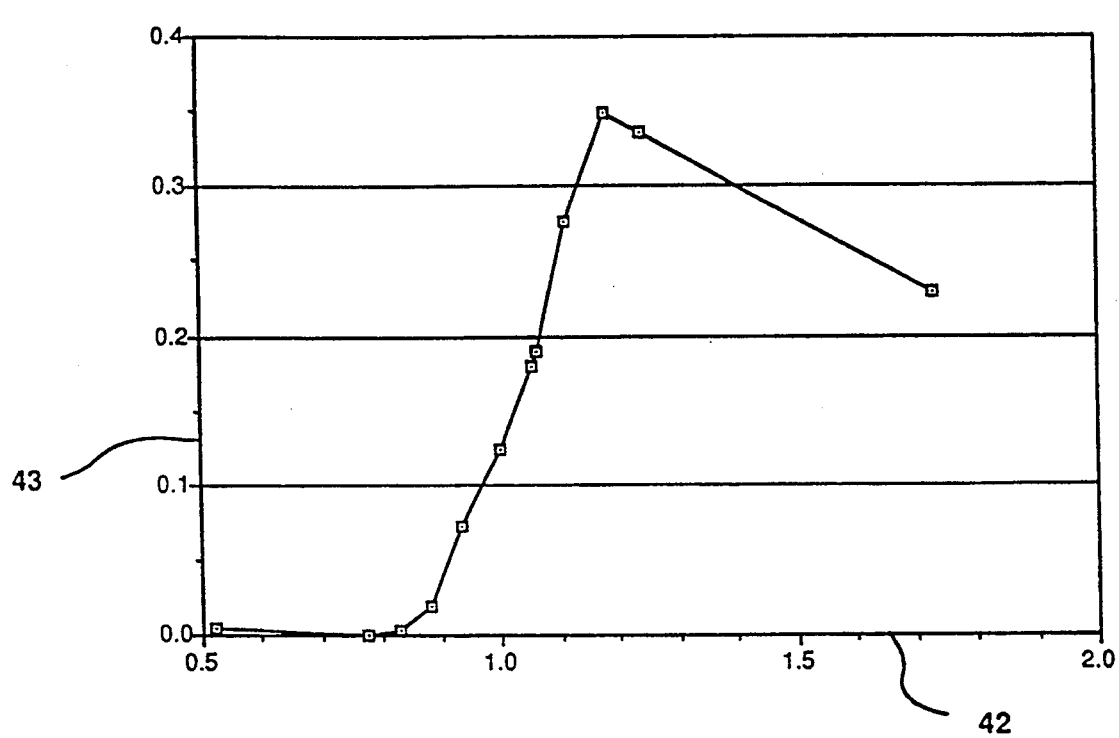
FIG. 7 is a diagram showing the relationship between window ratio and spectrum gain.

In the first step 32 of the method, the ratio between the counts in these two spectral is calculated. FIG. 7 shows an example of ratios for windows selected in the higher energy part of the spectrum. This figure shows the gain indicator ratio 43 versus the gain 42 for a capture gamma ray spectrum using the indicated windows. The ratios use the fact that in this measurement there are hardly any gamma-rays above an energy of 7.5 MeV. One window represents gamma rays at the very highest energy in the spectrum. The second window uses most of the top half of the spectrum. The second step 33 estimates an initial gain from the indicator ratio.

The third step 34 consists of adjusting the gain as indicated by the gain ratio. This step can be done either by incrementing the gain by a fixed amount or if the relationship can be used quantitatively, by calculating a gain correction. However, the relationship can only be used quantitatively if the high energy end of the spectrum is not very variable (i.e. the high energy part of the spectra changes very little in many different earth formations). Otherwise large deviations of the ratio will indicate only if the gain is high or low. This can be used to determine the direction of the gain adjustment if the fitting procedure has reached a local minimum. In this case it is more appropriate to adjust the gain in the indicated direction and to attempt a new spectral fit 35. This spectral fit 35 is the procedure of the present invention to determine the gain needed to correct or adjust the spectrum. As in the present invention, with this initial gain selection process, if the gain used in the spectral fitting step 35 does not produce an acceptable fit, the initial gain selecting process is repeated to select an initial gain for the spectral fitting process in step 35. If the fit is determined to be acceptable, as shown in step 36, the gain is adjusted according to the fit as indicated in step 37.

The method of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

We claim:

1. A method for regulating the gain of a nuclear well logging apparatus positioned in a wellbore traversing an earth formation, by using a measured particle or gamma ray energy spectrum of said wellbore and formation comprising the steps of:

a) detecting energetic particles from the wellbore and formation and measuring, by means of an energy scale, the energies of the particles deposited in a detector, and thereby generating the energy spectrum of said particles;

b) determining from a comparison of the energy spectrum and a standard composite energy spectrum, a gain correction factor; and c) regulating the gain of the apparatus using a gain correction signal derived from the gain correction factor.

2. The method of claim 1 wherein the comparison of the measured spectrum and the standard composite spectrum comprises:

aligning the measured and the standard composite spectrum;

adjusting the energy scale of the measured spectrum in such a way as to obtain the best alignment between the measured and standard composite spectrums; and calculating from the adjusted energy scale the gain correction factor.

3. A method for regulating the gain of a nuclear well logging apparatus positioned in a wellbore traversing an earth formation, by using a measured spectrum of said wellbore and formation comprising the steps of:

a) measuring a particle or gamma ray energy spectrum of the earth formation and wellbore;

b) setting the gain of the apparatus to an initial preset gain;

c) determining gain deviations in the measured spectrum by determining the best fit between a standard composite spectrum and the measured spectrum; and d) adjusting the gain of the apparatus using a correction signal determined from the fit.

4. The method of claim 3 wherein the initial gain is obtained by using a spectral fitting procedure.

5. The method of claim 3 wherein the initial gain is estimated from prior calibration measurements and current environmental conditions of the well logging apparatus.

6. The method of claim 3 wherein the energy spectrum is measured by detecting naturally occurring gamma rays.

7. The method of claim 3 wherein the energy spectrum is measured by detecting gamma rays that are emitted by radioactive tracer elements injected into the earth formation and borehole.

8. The method of claim 3 wherein the determination of the fit in step (c) comprises:

comparing the measured spectrum to a standard composite spectrum;

adjusting the energy scale of one of the energy spectra to obtain the best fit between spectra;

determining the quality of the obtained fit; determining whether the quality of the fit is within a desired tolerance for fit quality;

establishing a gain from the fit; and repeating the above steps until a fit is found within the desired tolerance.

9. The method of claim 8 further comprising the step of sending an error message to an operator if a fit quality within the desired tolerance is not found within a specific number of attempts.

10. The method of claim 3 wherein relative earth element formation contributions in the measured energy spectrum are simultaneously determined with the determination of gain deviations in step c.

11. The method of claim 10 wherein the correction signal is saved and used in the determination of relative earth element formation contributions.

12. The method of claim 3 wherein the initial gain is set before enabling or inserting a nuclear radiation energy source in the apparatus.

13. The method of claim 12 wherein the initial gain for the well logging apparatus is set by using a small calibration source.

14. The method of claim 13 wherein the initial gain is determined by using a peak search algorithm.

15. The method of claim 3 wherein the initial gain for the apparatus is obtained by using a measured spectrum.

16. The method of claim 15 wherein the initial gain is determined by using a grid search which is performed to obtain a range of gains within which a quality fit can be found comprising the following steps of:
    setting an initial gain estimate which is much higher or lower than an anticipated gain value;
    fitting the measured spectrum to a set of standard spectra;
    determining the quality of fit;
    adjusting the gain of the measured spectrum by a predetermined amount;
    saving this gain value and the corresponding quality of fit;
    repeating the steps of setting, fitting, determining, adjusting and saving for a predetermined number of times until the gain estimate is significantly lower or higher than the anticipated gain value;
    determining from the saved gain valves the gain value for which the quality of fit is best;
    using that value as the initial gain.

17. The method of claim 3 wherein the initial gain is estimated by dividing the measured spectrum in 2 or more strategically located windows and using a function of counts in the 2 or more windows to obtain an estimate of the gain.

18. The method of claim 17 where said function of the counts is the ratio between the counts in 2 or more windows.

19. The method of claim 17 where two windows are used and the function of the counts is the ratio between the counts in the two windows.

20. The method of claim 3 wherein the energy spectrum is measured by detecting energetic particles which result from irradiating the earth formation and wellbore with high energy neutrons.

21. The method of claim 20 wherein the detected energetic particles are gamma rays induced by the interaction of neutrons with materials in the earth formation and wellbore.

22. The method of claim 20 wherein said high energy neutrons are emitted by a chemical neutron source.

23. The method of claim 20 wherein said high energy neutrons are produced by an electronic source.

24. The method of claim 23 wherein the electronic source is pulsed.

25. A method for regulating the gain of an apparatus, that is used in nuclear spectroscopy, by using a measured energy spectrum of an irradiated material comprising:
    a) generating a energetic particle induced spectrum of the irradiated material;
    b) establishing a plurality of standard composite spectrum features to be used as reference features;
    c) determining deviations between said reference features and corresponding features of said measured energy spectrum; and
    d) adjusting the gain of the apparatus from the spectrum deviations.

26. The method of claim 25 wherein the deviations between the features of the measured spectrum and corresponding reference features are determined by:
    sampling a plurality of corresponding points of the generated energy spectrum and the reference features to determine the deviations between each pair of points;
    adjusting the gain based on the deviation between a pair of corresponding points;
    saving the adjusted gain for each pair of corresponding points; and
    selecting a spectrum gain as the best gain from the previously saved adjusted gains.

27. A method of determining the initial gain to serve as a reference gain from which the gain of a well logging apparatus will be regulated comprising the steps of:
    a) determining parameters for a test gain setting;
    b) generating a standard composite gamma spectrum;
    c) adjusting the standard composite spectrum to the test gain setting;
    d) determining the best fit between the standard composite spectrum and a measured energy spectrum; and
    e) determining the initial gain from the best fit.

28. The method of claim 27 wherein the best fit for the standard composite spectrum is determined by:
    sampling a plurality of corresponding points of the standard spectrum and a measured energy spectrum to determine deflations between each pair of points;
    adjusting the gain based on the deflation between a pair of corresponding points;
    saving the adjusted gain for each pair of corresponding points; and
    selecting an initial gain as the best gain from the previously saved adjusted gains.

29. The method of claim 28 further comprising, before the adjusting step, the step of calculating a gain based on the deviation between a pair of corresponding points; and before the selecting step, the step of repeating the previous steps of calculating, adjusting and saving steps for each of the corresponding pair of points.

* * * * *